(12) United States Patent
Maier et al.

(10) Patent No.: US 8,612,956 B2
(45) Date of Patent: Dec. 17, 2013

(54) EFFICIENT OBJECT PROFILING FOR OPTIMIZING OBJECT LOCALITY

(75) Inventors: Daryl James Maier, Unionville (CA); Nikola Groevski, Toronto (CA); David Kevin Siegwart, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1637 days.

(21) Appl. No.: 11/950,962

(22) Filed: Dec. 5, 2007

(65) Prior Publication Data

US 2009/0150875 A1  Jun. 11, 2009

(51) Int. Cl.
*G06F 9/45* (2006.01)

(52) U.S. Cl.
USPC ........................................................ 717/158

(58) Field of Classification Search
USPC ........................................................ 717/158
See application file for complete search history.

(56) References Cited

U.S. PATENT DOCUMENTS

| | | | | |
|---|---|---|---|---|
| 6,078,996 | A * | 6/2000 | Hagersten | 711/137 |
| 6,385,699 | B1 * | 5/2002 | Bozman et al. | 711/133 |
| 7,568,192 | B2 * | 7/2009 | Mitchell et al. | 717/159 |
| 7,735,073 | B1 * | 6/2010 | Kosche et al. | 717/158 |
| 2007/0234316 | A1 * | 10/2007 | Bayerlein | 717/140 |
| 2009/0150863 | A1 * | 6/2009 | Guo et al. | 717/116 |

OTHER PUBLICATIONS

Trishul M. Chilimbi, James R. Larus; Using Generational Garbage Collection to Implement Cache-Conscious Data Placement, 1998, pp. 37-48, Vancouver, B.C.

Wen-Ke Chen, Sanjay Bhansali, Trishul Chilimbi, Xiaofeng Gao, Weihaw Chuang; Profile-guided Proactive Garbage Collection for Locality Optimization; PLDI '06, Jun. 11-14, 2006, Ottawa, Ontario, Canada.

David Siegwart, Martin Hirzel; Improving Locality with Parallel Hierarchical Copying GC; ISMM Jun. 10-11, 2006; pp. 52-63; Ottawa, Ontario, Canada.

Ali-Reza Adl-Tabatabai, Richard L. Hudson, Mauricio J. Serrano, Sreenivas Subramoney; Prefetch Injection Based on Hardware Monitoring and Object Metadata; PLDI Jun. 9-11, 2004, pp. 267-276; Washington, DC.

Tatsushi Inagaki, Tamiya Onodera, Hideaki Komatsu, Toshio Nakatani; Stride Prefetching by Dynamically Inspecting Objects; PLDI Jun. 9-11, 2003, pp. 269-277; San Diego, California.

Yefim Shuf, Manish Gupta, Hubertus Franke, Andrew Appel, Jaswinder Pal Singh; Creating and Preserving Locality of Java Applications at Allocation and Garbage Collection Times; OOPSLA Nov. 4-8, 2002, pp. 13-25, Seattle, Washington.

* cited by examiner

*Primary Examiner* — Li B Zhen
*Assistant Examiner* — Bradford Wheaton
(74) *Attorney, Agent, or Firm* — Yee & Associates, P.C.; David A. Mims, Jr.

(57) ABSTRACT

A computer-implementable method, system and apparatus. The frequency of reference to an object, also known as "hotness," can be collected as a part of a profiling phase during a runtime operation of data-processing system by permitting each reference to the object during the runtime operation to randomly guess a predetermined value associated with the object, such that a correct guess thereof implies that the object is referenced frequently. Thereafter, the frequency of reference to the object can be validated by identifying a particular value in a header associated with the object, in response to collecting the frequency of reference to the object during the profiling phase, thereby increasing the scalability and efficiency of the runtime operation while permitting data associated with the frequency of reference to the object to other applications for immediate use.

2 Claims, 6 Drawing Sheets

EFFICIENT OBJECT PROFILING FOR OPTIMIZING OBJECT LOCALITY

TECHNICAL FIELD

Embodiments are generally related to data-processing systems and methods. Embodiments also relate in general to the field of computers and similar technologies, and in particular to software utilized in this field. In addition, embodiments relate to techniques and systems for object profiling and the optimization of object localities.

BACKGROUND OF THE INVENTION

The role of a "garbage collector" in a JVM (Java Virtual Machine) is to remove unreachable objects from the heap and create space for new ones. Generational garbage collection is a popular policy used in many JVMs because of its ability to quickly collect objects that die young. A popular generational scheme divides the heap into two sections: a nursery (or new space) where new objects are allocated, and a tenure area (or old space) where longer-lived objects reside. The new space itself is divided into an allocate space and a survivor space. New objects are allocated in the allocate space and when that space fills up the garbage collector (GC) determines which objects are still alive and copies them to the survivor space. The roles of the survivor and allocate areas are then reversed, and new object allocations are made in the new allocate space. Once an object has survived a number of copies it is no longer considered young and is copied to the tenured space.

On large workloads (e.g., an application server such as IBM WebSphere® Application Server, etc.), analysis reveals that a significant proportion of processor cycles are spent waiting for heap data to be paged in from backing store (i.e., a page fault), or to arrive from main memory or an outer level of the cache hierarchy (e.g., a cache miss), or to translate a virtual address into a physical one (e.g., a translation lookaside buffer miss). Many of these misses are due to the poor locality of objects in the heap. Locality of reference is a principle in computing science that states that computer programs usually repeatedly access data related either spatially or temporally. In other words, if the program accesses a certain memory location L, it can be expected that it would access some other memory location close to L soon. There is also a strong likelihood that if a certain memory location is accessed once, it might be accessed again several times in a relatively short duration. It is well known that improving the reference locality of objects in the heap can result in significant performance improvements by reducing cache and TLB misses.

A garbage collector usually makes indiscriminant choices when deciding where to copy objects and this is the typical cause of degenerate locality. Locality can be improved if the garbage collector understands both the relationships between Java object references at runtime and the memory hierarchy of the underlying hardware. Examining references to objects reveals that some are accessed much more frequently than others. Such objects are referred to as "hot" and the remaining objects are referred to as "cold". Locating hot objects close together on the heap has the dual effect of reducing page spread and improving TLB performance in addition to reducing cache line conflicts among hot objects.

Although static analysis of class usage in methods can yield some limited useful information for GC, the most accurate understanding of object relationships comes from profiling references at runtime (or some combination of the two). Profiling which objects are referenced while an application is running is extremely challenging. The overhead of profiling must be low enough that it does not defeat any gains realized by better locality, it must scale well in a multi-threaded environment, and the GC has to efficiently process the data collected and use it.

Some prior art solutions have collected traces of object references into a buffer and/or setting a bit in a word on the object to indicate that it has been referenced. Profiling is either continuous or requires cloning methods with instrumentation inserted and control logic to switch between the two bodies depending on whether a profiling phase is active or not.

The solution described herein therefore presents a novel mechanism for determining the frequency of access of Java heap objects at runtime that has extremely low instrumentation overhead, is scalable, and is highly space efficient. Enhancements to a garbage collector are thus described in greater detail herein to calibrate the quality of data collected and to use the information to optimize object placement to minimize cache and TLB misses in the heap.

Understanding the frequency of reference (or "hotness") of an object is an important first step for many data locality-based optimizations by a garbage collector. It is a challenge to collect and process hotness information efficiently at runtime without introducing significant overheads that outweigh any benefits realized by improved data locality. This disclosure proposes a novel mechanism for determining the frequency of access of Java heap objects at runtime that has low instrumentation overhead, is scalable, is highly space efficient, and where the hotness information is readily available per object to a garbage collector for immediate use.

Previous runtime profiling solutions based on sampling have attempted to reduce overhead by cloning methods and inserting profiling instrumentation into the cloned version and control logic to switch between the two bodies at regular intervals. This approach does not work well in large-scale production middleware applications because of the huge number of methods involved and the resulting footprint cost of cloning each method. In addition, the instrumentation control logic is never completely removed and adds continuous drag to throughput performance. Our mechanism is superior in production environments because we use self-modifying code to insert and remove profiling instrumentation without duplicating methods. The metadata requirements to support patching methods are significantly less than cloning the entire method and the runtime profiling code itself can be shared among methods. The instrumentation logic is completely removed from methods in our mechanism. Determining the set of heap objects that are referenced more frequently than others is typically done by static analysis, associating a counter with each object, or tracing references to objects into a buffer.

The static analysis approach looks at object allocation sites and field references in hot execution paths through an application and determines hotness by the classes being referenced. While the overhead is low the results are general as this cannot identify specific object instances that are hot. Another approach is to have a counter associated with each object that is incremented each time it is referenced at runtime. Some mechanism is required to control when counting occurs. While it does collect accurate reference count statistics, the presence of the counter bloats the object and requires that the object be touched on each reference to update the counter. In practice, this scheme contributes to the cache locality problem we are trying to solve.

Finally, buffer based approaches that write traces of object references into a buffer have also been used. An affinity graph can be constructed from the data in the buffer that show not only hotness of objects but their temporal relationships. However, the number of objects involved in production systems will quickly overwhelm any buffer-based profiling scheme unless significant memory is dedicated to the buffers, and the overhead of managing buffer pointers and storing data is high. In addition, a separate buffer is needed per thread such that scalability does not suffer. In all the above cases a garbage collector must aggregate the profiling data collected before it can use it for locality based optimizations, and this may incur significant time and space overheads. The present invention, on the other hand, as disclosed in greater detail herein utilizes probability to accurately determine whether objects are hot or not and represents this efficiently with a single bit associated with each object. Because hotness is determined at runtime the information is available for immediate use by the garbage collector without any aggregation or processing of data.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for object profiling.

It is an additional aspect of the present invention to provide for an improved method, system and computer-usable medium for determining the frequency of reference to an object during a runtime operation of a data-processing system or apparatus.

It is an additional aspect of the present invention to represent the frequency of reference to an object in a space efficient manner.

The aforementioned aspects and other objectives and advantages can now be achieved as described herein. A computer-implementable method, system and apparatus are disclosed. In general, a frequency of reference to an object can be collected as a part of a profiling phase during a runtime operation of a data-processing system. Thereafter, the frequency of reference to the object can be validated by identifying a particular value in a header associated with the object, in response to collecting the frequency of reference to the object during the profiling phase, thereby increasing the scalability and efficiency of the runtime operation while permitting data associated with the frequency of reference to the object to other applications for immediate use thereof.

Note that sampling the reference to the object generally occurs over a plurality of phases in order to reduce the overall overhead of instrumentation associated with the data-processing system. Also, a self-modifying code can be provided to patch in branches to shared profiling code snippets during the profiling phase in order to assist in collecting and validating the frequency of reference to the object.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
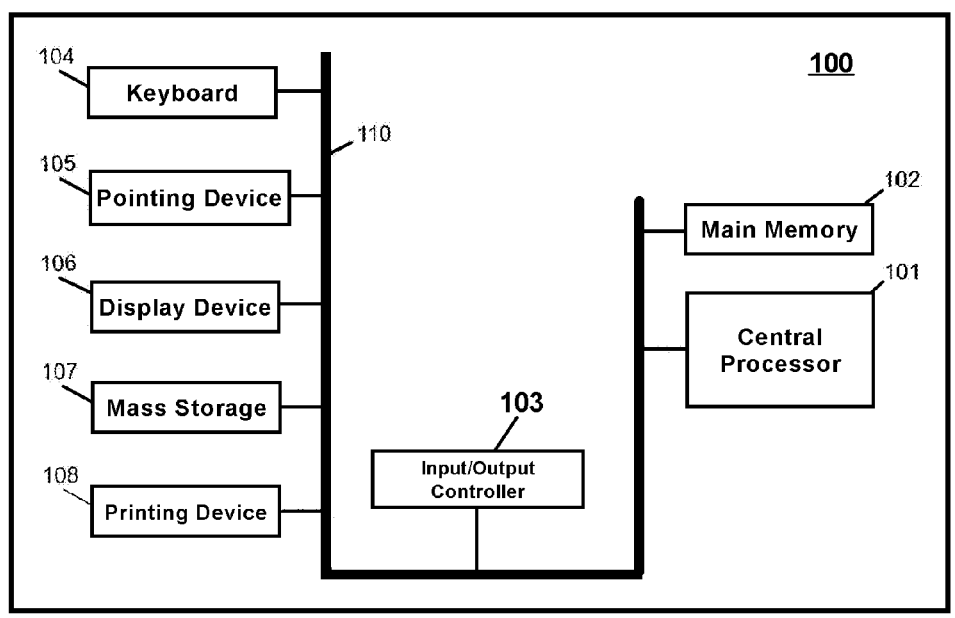
FIG. 1 illustrates a schematic view of a computer system in which the present invention may be embodied.

As shown in FIG. 1, the present invention may be embodied on a data-processing system 100 comprising a central processor 101, a main memory 102, a keyboard 104, a pointing device 105 (e.g., mouse, track ball, pen device, or the like), a display device 106, an input/output controller 103, and a mass storage 107 (e.g., hard disk). Additional input/output devices, such as a printing device 108, may be included in the data-processing system 100 as desired. As illustrated, the various components of the data-processing system 100 communicate through a system bus 110 or similar architecture.

Figure 2:
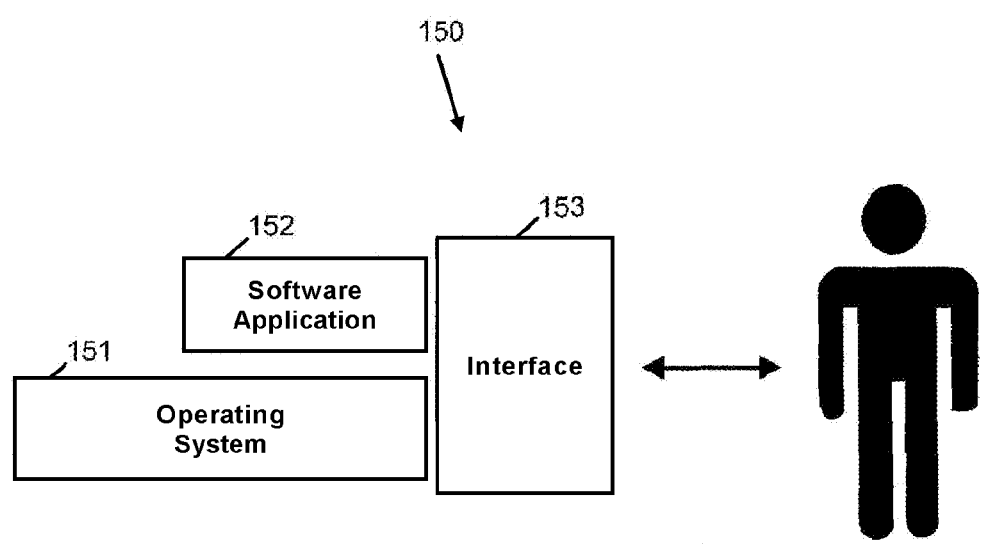
FIG. 2 illustrates a schematic view of a software system including an operating system, application software, and a user interface for carrying out the present invention.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152. The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein with respect to respective methods 300, 500, and 700 of FIGS. 3, 5, and 7.

The following description is presented with respect to embodiments of the present invention, which can be embodied in the context of a data-processing system such as data-processing system 100 and computer software system 150 depicted in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

The disclosed embodiments utilize statistics to derive object "hotness". Each reference to an object at runtime is allowed to make a random guess of a predetermined value. A correct guess implies that the object is referenced frequently. The more often an object is referenced, the more random guesses it will be allowed to make, thereby increasing the likelihood of a correct guess. Whether or not an object is "hot" is indicated by a single bit in the header of each object. Object references can be sampled in phases rather than continuously in order to reduce the overall overhead of instrumentation. The embodiments disclosed herein include the use of self-modifying code to patch in branches to shared profiling code snippets during profiling phases that perform the guess and validation code. This approach is space and runtime efficient, and makes the overhead of instrumentation negligible when profiling is not occurring. Parameters in the mechanism can be calibrated at runtime in order to make certain that the sample of objects marked as "hot" is representative of the object reference and population characteristics of a particular application. The hotness data collected as a result of implementing such an approach can be utilized immediately by a "garbage collector" as discussed in further detail herein without further processing.

Figure 3:
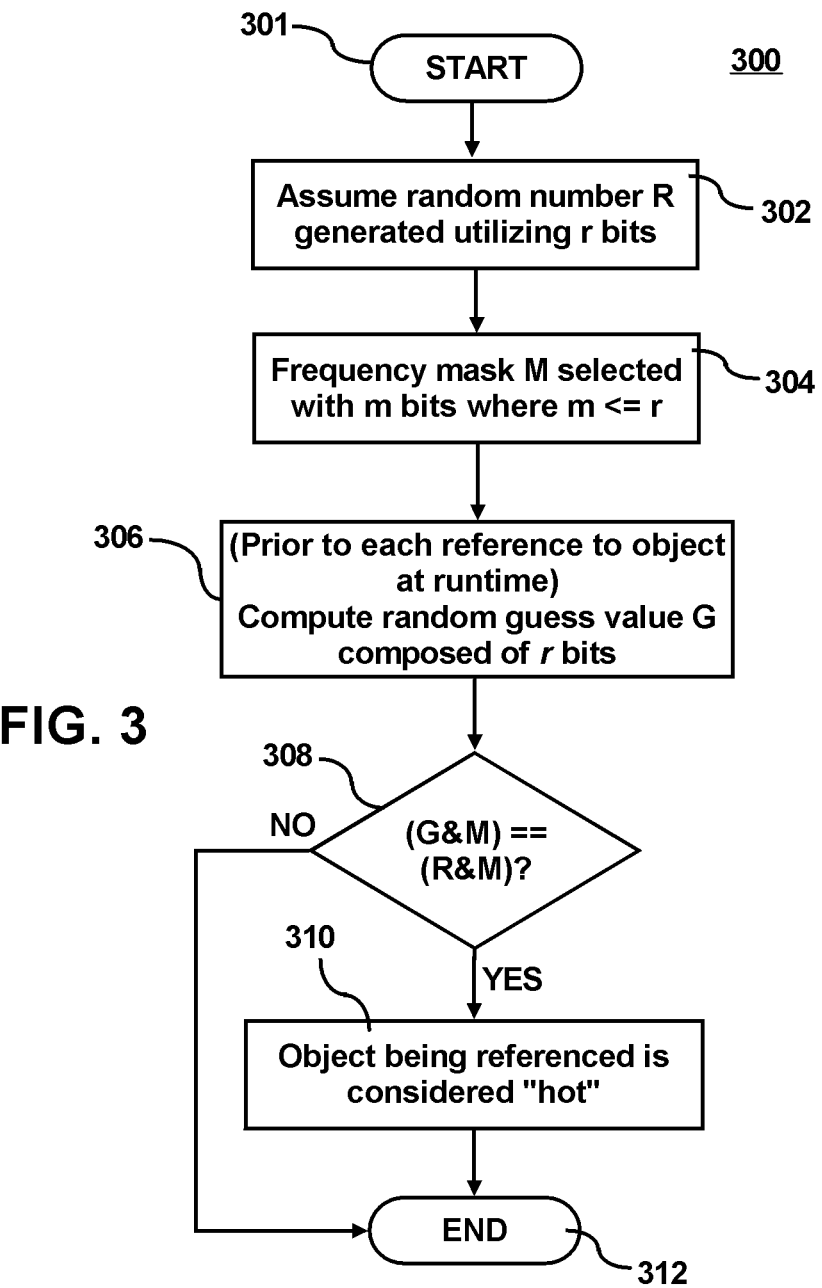
FIG. 3 illustrates a high-level logical flowchart of operations illustrating an exemplary method of object profiling and management, in accordance with a preferred embodiment.

FIG. 3 illustrates a high-level logical flowchart of operations illustrating an exemplary method 300 of object profiling and management, in accordance with a preferred embodiment. The process generally begins, as indicated at block 301. Next, as depicted at block 302, an assumption can be made that a random number R is generated using r bits. Thereafter, as depicted at block 304, a frequency mask M can be selected comprising m bits where m<=r. As an aside note that when m<r the bits in M need not be consecutive. Prior to each reference of an object at runtime as illustrated next at block 306, a random guess value G can be computed comprising of r bits. If the relation (G & M)==(R & M) holds as depicted next at block 308, then the object being referenced is considered "hot" as indicated thereafter at block 310. The process can then terminate as depicted at block 312

Informally, each reference to an object can be allowed to make a random guess G of a predetermined value R. A correct guess is very unlikely, given that m is chosen sufficiently large. But the more often an object is referenced the more random guesses will be tried on it, increasing the likelihood of a correct guess. Thus, if after the end of a profiling phase a correct guess has been made at least once on the object then the object is most likely to have been referenced frequently.

The frequency mask M selects a subset of bits in the random value to use during guess validation, and it effectively modulates the probability of a correct guess. It is important to choose M with enough bits to decrease the probability that a guess will be successful unless the object is truly "hot", and conversely, M should not have so many bits that it makes a correct guess extremely unlikely. The composition of M depends on the object usage characteristics of the application and will be empirically set during a calibration phase.

Generation of a random guess G is done efficiently at runtime using a prime modulus linear congruential generator with a long period and sufficient randomness through 31-bits for this invention. Each thread caches its own thread-local seed and generates the initial seed from the output of a runtime clock (e.g., such as the output of the monotonically increasing RDTSC instruction on the IA32 architecture).

Figure 4:
FIG. 4 illustrates a block diagram of an object header, in accordance with a preferred embodiment.

Each Java object consists of an object body containing information that is directly accessible by the Java application, and an object header that is invisible or indirectly seen by the application, and contains a flags field. FIG. 4 illustrates a block diagram of an object header 400, in accordance with a preferred embodiment. The solution described herein preferably utilizes one bit 402 in the flags field of the object header 400 of each Java object to represent hotness. To improve runtime efficiency and scalability, it is important that this bit 402 be set without requiring an atomic update of the header 400.

The effectiveness of the object placement depends on having accurate object reference frequency information available. However, references to Java objects are numerous on large workloads and continuously profiling each reference will degrade overall application throughput to such an extent that the cost of profiling will outweigh the benefits of more optimal object placement. The scheme described herein profiles objects in periodic phases with a profiling duty cycle selected to be a small proportion of the overall period to minimize overhead. In this manner, a "profiling phase" can be provided, wherein methods have been instrumented with profiling hooks and a "throughput phase" when such hooks are absent.

Instrumentation (or "profiling hooks") can be inserted during profiling phases using self-modifying code to patch the instruction stream at profiling sites For instance, a profiling site follows each object reference that, when hooked, redirects execution to specialized profiling code that chooses a random number G, validates it against R, and sets the appropriate object hotness bit if necessary. Threads will not be blocked from executing code in the method while the patching proceeds. The main advantages of using self-modifying code to insert and remove runtime instrumentation are that 1) the overhead of the instrumentation is negligible when the system is not profiling, 2) the overhead of inserting and removing the instrumentation guards is negligible if the profiling phases account for a relatively small percentage of the overall application execution time, and 3) it is a far more efficient use of code buffer space than producing a cloned copy of a method that contains instrumentation and logic to switch between them.

The instrumentation technique described herein requires that each profiling site be constructed with a low-overhead, side effect free instruction that can be efficiently patched with an unconditional call instruction to some profile collection code. The IA32 implementation of this requires a 5-byte "NOP" instruction with the additional constraint that the last byte of the instruction is 0x00. This constraint is necessary so that the single NOP instruction can be efficiently transformed into a 5-byte direct call instruction with a single 4-byte write without requiring any locking primitives. Since the last byte of the NOP instruction is constrained to be 0x00 this limits the target displacement of the call instruction to be within $+2^{24}$ (or 16 megabytes) of the profiling site. This is not a significant restriction as code buffer sizes tend to be much smaller than 16 MB in practice and we can control the placement of the runtime instrumentation code such that it always appears after its corresponding profiling site.

To further improve the runtime efficiency of the patching mechanism, methods are patched lazily as they are executed. The IBM J9® JVM, for example, utilizes a cooperative suspend policy for threads which relies on each thread checking periodically if an asynchronous message is pending in a per-thread event mask E. Polling for messages occurs at asynchronous message checkpoints on method entry and on optimally placed points within methods (e.g., such as back edges). The disclosed mechanism uses this asynchronous message framework to communicate when methods need to be instrumented during profiling phases (e.g., known as hook events) and when instrumentation must be removed during throughput phases (known as unhook events).

As each thread processes a message the corresponding event is cleared in E. However, since instrumentation messages apply "per-method" rather than "per-thread" our invention uses a further technique to decrease the instrumentation overhead by preventing each thread from continuously polling whether a method should be patched with instrumentation or not. We now introduce two event masks, E1 and E2, with each thread that operate identically as the original mask E except that a hook event will only be signaled on E1 and an unhook event will only be signaled on E2. The asynchronous message check points in a method that has not been instrumented poll E1 for all messages or hook event. Once a hook message is received, the profile hooks are inserted and all asynchronous message check points are changed to listen to E2 (this is simply a matter of changing the displacement of the thread-local field where messages are polled). Similar functionality occurs for methods that are presently hooked and listening for an unhook event.

To support the profiling framework requires metadata to be associated with each method to describe the location of the profiling hooks and their hooked contents, and the location of asynchronous check points. Metadata is already needed for Java methods (for example, to describe exception ranges) and can easily be supplemented with the profiling information. The profiling site metadata is encoded efficiently by storing the byte displacement to the next profiling metadata followed by the hooked bytes.

The profile collection code to compute G and validate against R can be shared among several methods in a code buffer. The runtime code can be further optimized by specializing it for the register that holds the base address of the object and the scratch registers it needs to compute the guess and do the comparison. Ideally, the scratch registers used should be those that are unassigned across the profiling site. The base register and the preferred scratch registers form a unique signature that can be hashed to search for an existing instance of the specialized runtime code. If none is found then the specialized code can be added to the end of the code cache and added to the hash table. Otherwise, the found runtime method code can be used.

Even with a low-overhead profiling mechanism it is not practical to profile objects continuously. Hence, profiling occurs in periodic phases but the whole mechanism itself can be enabled or disabled based on input from GC. For instance, if GC detects that the tenured space growth is in the process of slowing down or if it receives feedback from hardware counters of increased cache or TLB misses, then a profile collection operation can be enabled in phases. Similarly, if profiling determines that few objects are hot enough to make locality optimizations useful or if hardware counters show that cache or TLB miss rates have declined sufficiently then the profiling mechanism can be disabled until the environment changes. GC monitoring for when profiling would be beneficial can be continuous.

Figure 5:
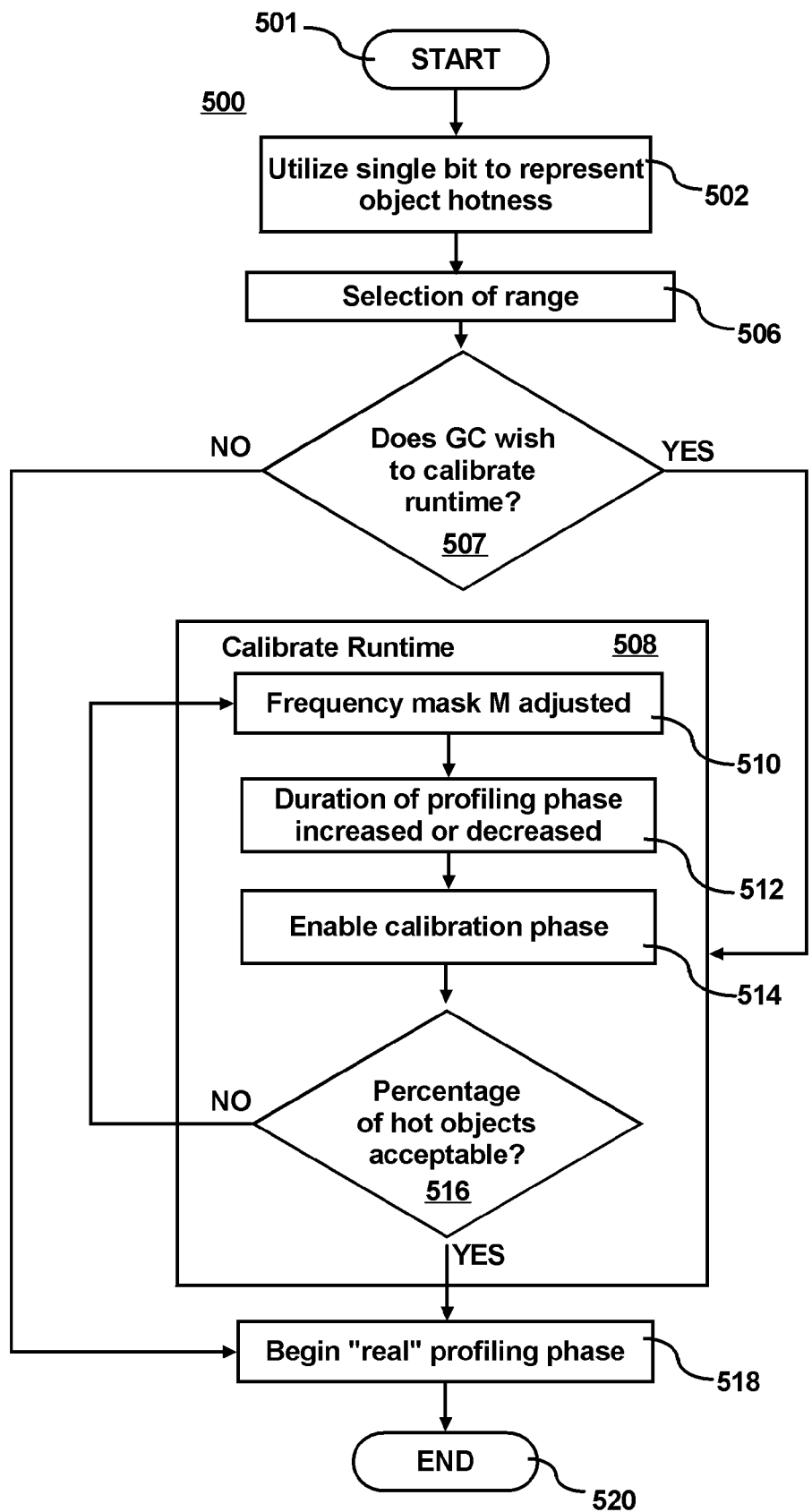
FIG. 5 illustrates a high-level flow chart of operations depicted a method for object profiling and management that can be implemented in accordance with an alternative embodiment.

When a single bit is used to represent the frequency of reference to an object, the quality of profiling data collected depends on the difficulty of the random number guess and on the duration of the profiling phases. These dependencies differ between applications because of differences in object allocation and consumption. Therefore, FIG. 5 illustrates a high-level flow chart of operations, as depicted at method 500, for object profiling and management that can be implemented in accordance with an alternative embodiment and in order to maximize the quality of the profiling data by calibrating itself such that the percentage of objects found to be hot must fall within an acceptable range (e.g., 8-10%).

As depicted at block 501, the process begins. Next, as indicated at block 502, a single bit is used to represent object hotness. An acceptable range can be selected, as indicated at block 506, based heuristically on the population of objects in the heap and the number of live objects remaining after previous GC cycles. The GC can decide, as indicated at block 507, whether to enable the calibration illustrated at 508 or whether to begin real profiling as indicated at block 518.

The runtime can be calibrated as indicated at block 508 in two approaches in order to attempt to bring the percentage of hot objects marked within that range. First, as indicated at block 510, the frequency mask M can be adjusted to make the guess easier or harder. The more bits in M the more difficult the guess will be. Second, as depicted at block 512, the duration of the profiling phase can be increased or decreased depending on whether too few or too many objects are being marked hot.

A calibration profiling phase can then begin as depicted at block 514. Such a calibration profiling phase utilizes the preferred embodiment depicted earlier in FIG. 3. As depicted at block 516, calibration phases are executed until the percentage of hot objects falls within the acceptable range, which determines the frequency mask M and profile duration. Once suitable parameters have been found, a real profiling phase can begin as depicted at block 518. The process can then terminate, as indicated thereafter at block 520. From the profiling runtime's perspective, a calibration phase and a profiling phase are identical—the GC simply uses the data collected for different purposes.

Because this mechanism makes a "guess" per object reference site, it is possible that an infrequently accessed object may be mistakenly marked hot because the reference site itself is hot. For example, this can occur in the context of a loop that iterates over a long linked list of unique objects. None of the objects in the list are "hot" at this site, but the more iterations that occur through the reference site, the likelihood that one of the objects will be mistakenly marked as "hot" will be increased. The solution to this problem is to add a second bit to the flags field of an object to represent hotness as depicted in FIG. 6.

Figure 6:
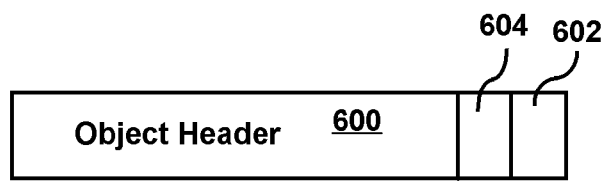
FIG. 6 illustrates a header and a plurality of bits, which can be implemented in accordance with an alternative embodiment.

FIG. 6 illustrates a header 600 and bits 602, 604, which can be implemented in accordance with an alternative embodiment. The two bits 602, 604 can behave like a two-bit saturating counter and can keep track of whether an object was never marked hot, marked hot only once, twice, or marked hot multiple times. This scheme reduces false positives by requiring that an object guess the correct value at least twice before it is considered hot. In practical applications we have not yet seen a need to solve this theoretical possibility and a single hotness bit per object is sufficient.

Figure 7:
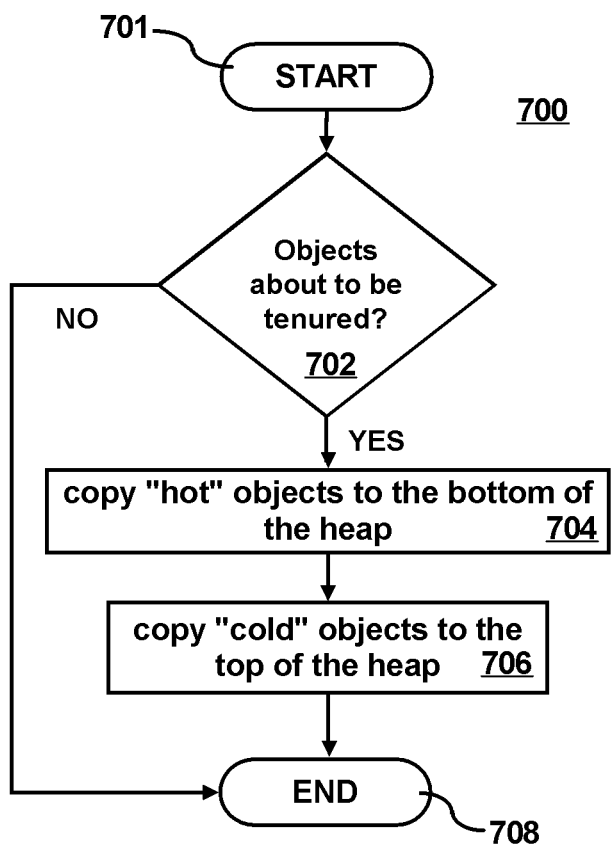
FIG. 7 illustrates a method of "garbage collection" exploitation, which can be implemented in accordance with alternative embodiments.

FIG. 7 illustrates a method 700 of "garbage collection" exploitation, which can be implemented in accordance with alternative embodiments. Based on the foregoing, it can be appreciated that the embodiments described herein can determine the hotness of an object during the profiling phase and no further processing is required by GC (Garbage Collection). Once any calibration phases have concluded, the object "hotness" data is readily available for immediate use by GC as outlined in method 700 depicted in FIG. 7. The process generally begins, as illustrated at block 701.

First, as indicated at block 702 in a generational collector, objects are identified as about to be tenured because they have survived a minimum number of flips in the "nursery". How such objects are tenured depends on whether the objects are considered "hot or "cold". As depicted respectively at blocks 704 and 706, objects that have been identified as "hot" are copied to the bottom end of the tenured space, the allocation pointer moving forward while "cold" objects are copied to the top end of the tenure space, with the allocation pointer moving backwards. The primary benefit of this is to improve page-level locality of hot data. The process can then terminate, as indicated at block 708

Note that object hotness information can be applied to various generational GC object traversal schemes during scavenging or tenuring such as breadth-first, depth-first, or hierarchical. The hotness information can be used to guide the traversal by identifying which object to follow next. This imposes some order on the hot objects as they are tenured and has the benefit of improving both page-level and cache line locality of hot data.

Note also that hot reads and hot writes to an object can be distinguished with a second hotness bit in each Java object's flags field. It is important to distinguish references to an object as either read references or write references because GC can do more optimal object placements when it understands the kind of access. For instance, objects that are hot writers should not be allocated on the same cache line as other hot writers to minimize the effects of false sharing (where multiple processors write to memory mapped to the same cache line but not the same location causing the shared line to thrash between processors).

It should be understood that at least some aspects of the present invention may alternatively be implemented in a computer-useable medium that contains a program product. For example, the processes depicted in FIGS. 3, 5, and 7 herein can be implemented in the context of such a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, the methods 300, 500, and 700 described herein, and in particular as shown and described in FIGS. 3, 5, and 7, can be deployed as process software in the context of a computer system or data-processing system as that depicted in FIG. 1-2.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implementable method, comprising:
   collecting a frequency of reference to an object as a part of a profiling phase during a runtime operation of a data-processing system;
   thereafter validating said frequency of reference to said object by identifying a particular value in a header associated with said object, in response to collecting said frequency of reference to said object during said profiling phase, thereby increasing the scalability and efficiency of said runtime operation while permitting data associated with said frequency of reference to said object to other applications for immediate use thereof; and
   determining said frequency of reference to said object utilizing a statistical probability; and
   determining said statistical probability by permitting each reference to said object during said runtime operation to compare a randomly generated value against a predetermined value, such that an exact match thereof implies a statistical probability that said object is referenced frequently.

2. The computer-implementable method of claim 1, further comprising:
   representing said statistical probability utilizing said particular value in said header associated with said object.

* * * * *